United States Patent [19]
Chromy

[11] 3,773,122
[45] Nov. 20, 1973

[54] ROCK DRILLING TOOL

[75] Inventor: Franz Chromy, Feldkirch-Levis, Austria

[73] Assignee: Palar (Curacao) N.V., Netherlands

[22] Filed: June 7, 1972

[21] Appl. No.: 260,562

[30] Foreign Application Priority Data
June 16, 1971 Germany.................. P 21 29 913.8

[52] U.S. Cl.................. 175/385, 175/394, 175/410
[51] Int. Cl. ........................................... E21c 13/06
[58] Field of Search.................. 175/385, 389, 386, 175/388, 387, 390

[56] References Cited
UNITED STATES PATENTS
2,578,593  12/1951  Phipps .............................. 175/385
2,938,709  5/1960  Curtis ................................ 175/390

FOREIGN PATENTS OR APPLICATIONS
1,265,613  5/1961  France ............................... 175/385
   354,406  7/1961  Switzerland........................ 175/385

Primary Examiner—Marvin A. Champion
Assistant Examiner—Richard E. Favreau
Attorney—David Toren et al.

[57] ABSTRACT

A rock drilling tool, such as used with a hammer drill, consists of an axially extending shank and a drilling tool head at one end of the shank which provides the rock drilling or cutting action. The drilling tool head includes a centrally positioned axially extending centering projection with at least three angularly spaced drilling fingers disposed radially outwardly from the centering projection and forming therebetween an annular recess which extends inwardly into the drilling tool head from the axial end surfaces of the drilling fingers. Each drilling finger has a drilling tooth on its axial end surface and a circle including the radially outer surfaces of the drilling teeth has a greater diameter than the diameter of the shank. The arrangement of the centering projection, the spaced drilling fingers and the annular recess affords efficient removal of drilled material and reduced friction between the hole being drilled and the drilling tool.

11 Claims, 2 Drawing Figures

PATENTED NOV 20 1973 3,773,122

ROCK DRILLING TOOL

SUMMARY OF THE INVENTION

The present invention is directed to a rock drilling tool, especially for use with hammer drills, and, more particularly, it concerns the arrangement of the rock cutting structure on the head of the rock drilling tool.

A rock drilling tool, formed in accordance with the present invention, is practically unlimited in its uses. However, the preferred use of the tool is in forming wall openings, such as are required for installing services in buildings, for example, for passing water pipes, electrical lines and the like through building walls.

In the past openings have been formed in building walls by means of drill bits having a centering drill. Due to the great differences between the diameter of the shank of the drill steel and the drill bit, the tool is usually made in two parts. Further, as a rule, the two parts are joined by means of a conical connector.

When a conical connector is used, there is a considerable disadvantage in that a fiarly large part of the energy of the drilling machine, depending on the dimensions of the drill bit, is converted to heat and, as a result, the full power of the drilling machine is not available for forming or producing the drilled hole or bore.

Another disadvantage experienced in working with such drill bits is that the drilled material cannot escape from the interior of the bit, since the bit must be closed at its rear end to accommodate the conical connector. Therefore, it is necessary to withdraw the drilling tool relatively frequently from the bore hole during drilling operations, so that the drilled material can be removed from the interior of the bit. Such operations are extremely time-consuming and non-productive.

In bore holes whose depth exceeds the axial length of the drill bit, there is the additional problem of considerable friction being developed between the outer wall of the drill bit and the wall of the bore hole. To avoid such a problem, it has been necessary to produce long bore holes in two or more stages. In the first stage, a hole is drilled with a conventional spiral drill whose diameter is smaller than that of the required diameter for the wall opening. In the second stage, the hole initially formed is widened to the desired diameter by means of a drill bit. This method of drilling holes is extremely uneconomical, because it is very time-consuming due to the different operations involved and also because a number of tools are subjected to great wear in forming a single bore hole.

Therefore, the primary object of the present invention is to provide a drill suitable for use with drilling machines, such as hammer drills, while avoiding the problems and disadvantages experienced in the past.

In accordance with the present invention, a rock drilling tool is formed of an axially extending shank and a drilling tool head having at least three drilling fingers extending radiallly relative to the center of the head. A drilling tooth is provided in the axial end surface of each of the drilling fingers and the radially outer surfaces of the drilling piece lie in a plane having a diameter greater than the diameter of the shank.

Spaced inwardly from the radially inner end surfaces of the drilling fingers and teeth and located along the axis of the shank is a centering projection of substantially circular cross section which extends axially beyond the axial end surfaces of the drilling teeth.

Located between the periphery of the centering projection and the radially inner surfaces of the drilling fingers and teeth is an annular recess which extends axially inwardly from the axial end surfaces of the drilling teeth. Further, for providing the drilling or cutting action, each of the drilling teeth has a radially extending hard metal insert.

Since the drilling fingers are spaced angularly apart, an open space is provided around the periphery of the drilling tool head between the adjacent surfaces of the drilling teeth. To provide adequate removal of the drilled material, the spacing between the radially inner roots of adjacent drilling teeth, the maximum radial dimension of the open space between adjacent drilling teeth and the depth of the annular recess are formed at least equal to the difference between the radius of the centering projection and the radius of the circle which includes the radially inner end surfaces of the drilling teeth.

Due to the star-shaped arrangement and spacing of the drilling fingers, the friction between the drilling tool head and the bore hole is reduced by a very considerable amount and, further, there is sufficient open space for the unhindered removal of the drilled material from the hole. Compared to a conventional spiral drill, the drilling tool embodying the present invention is much more efficient, particularly because of considerable savings in weight and the different method employed in removing the rock or similar material. In the drilling operation afforded by the present invention, the face of the bore hole is no longer worked over its entire surface, rather an annular section is left in the recess between the centering projection and the drilling teeth. The annular section is not removed directly by a cutting action, instead it is broken out gradually due to the vibrations developed in the drilling operation. Since the entire material removed in forming the bore hole is not ground to dust, a considerable portion of the power previously used, can be saved. The relatively coarse-grained material which is provided as the annular section breaks up, can be efficiently removed from the annular recess in the drilling tool head through the free or open spaces between adjacent drilling fingers and then passes rearwardly along the shank out of the bore hole.

To prevent lateral jamming of the drilling tool head within the bore hole, the diameter of the outer surfaces of the drilling teeth is reduced in the axial direction toward the shank, in a tapered arrangement. The tapered exterior surface of the drilling tool head facilitates the removal of the drilled material and assists in the reduction of the friction developed between the drilling fingers and the surface of the bore hole. Tests have indicated that the optimum arrangement of the tapered surface is at an angle of inclination of about 5°.

Because of its centered and leading position on the drilling tool head, the centering projection is subject to the greatest amount of wear. Therefore, it is advantageous if the centering projection is removably connected to the drilling tool head so that it can be replaced. The connection of the centering projection can be effected in various ways. A rigid connection, such as by soldering or threading the centering projection onto the head is preferable over a friction joint since there is no energy loss in a rigid connection due to a conversion to heat. To increase the useful life of the centering projection, its rock cutting surface is formed by a radially extending hard metal insert. If the hard metal insert is soldered to the centering projection, it is preferable to use a solder which has a higher melting point than that of the joint between the centering projection and the drilling tool head. Accordingly, the soldered joint of the hard metal insert is not affected when a soldered centering projection is repalced on the drilling tool head. Instead of using a hard metal insert, the cutting surface of the centering projection can be hardened by a heat treatment. Further, the useful life of the centering projection can be extended if it is provided with opposite plane surfaces instead of a completely circular cross section.

For removing drilled material from the bore hole rearwardly of the drilling tool head, the shank of the tool is provided with a loosely attached helically shaped sheet metal member which is secured to the tool by means of an entraining element. When a cylindrically shaped shank is used for the tool, and the forward end of the sheet metal member is bent-off between a pair of the drilling fingers, a wedge can be used as the entraining element for removably fixing the member to the shank of the tool. For securing the sheet metal member where the shank has a polygonal cross sectional shape, such as a hexagonal shape, the inner range of the member is shaped to fit the profile of the shank. In practice, no special axial anchoring of the sheet metal member is required, because the member is pushed automatically toward the head of the drilling tool due to the friction developed with the surface of the bore hole as the tool effects a rotating or screwing movement. However, if it is necessary to anchor the sheet metal member in the axial direction for some particular reason, the anchoring can be provided by a threaded connection and the like. Further, an integral connection of the sheet metal member with the shank, such as by welding, is unsuitable because it is advantageous if the helically coiled sheet metal member can be replaced.

Optimum removal of the drilled material from the bore hole is achieved if the outside diameter of the sheet metal member corresponds substantially to the diameter of the circle including the radially outer surfaces of the drilling teeth surmounting the drilling fingers. In tests, the best results were obtained where the helically coiled sheet metal member had a diameter about 2-3 mm smaller than the diameter of the circle including the radially outer surfaces of the drilling teeth.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
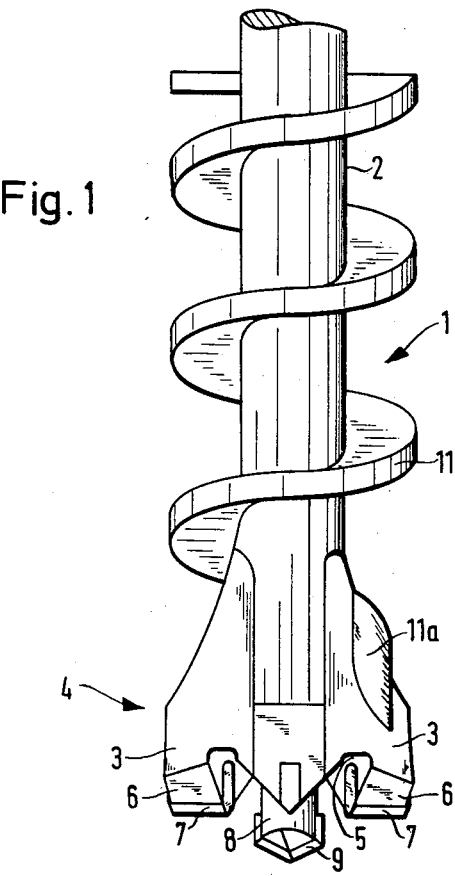
FIG. 1, is an elevational view of a rock drilling tool embodying the present invention.

In FIG. 1 a rock drilling tool 1 is illustrated consisting of an axially elongated shank 2 with a drilling tool head 4 secured to one end of the shank.

Figure 2:
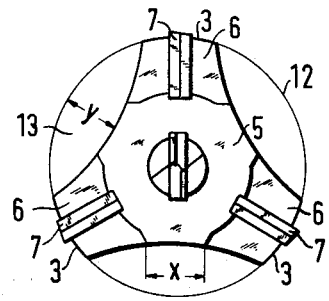
FIG. 2 is a head end view of the rock drilling tool shown in FIG. 1.

The drilling tool head 4 includes three angularly spaced drilling fingers 3 extending axially from the shank and also projecting radially outwardly from the axis of the shank beyond the exterior surface of the shank. Spaced radially inwardly from the inner surfaces of the drilling fingers is a centering projection 8 located on the axis of the shank. An annular-shaped recess 5 is formed between the lateral surface of the centering projection and the radially inner surfaces of the drilling fingers. As can be seen in FIG. 2, the recess extends axially inwardly into the drilling tool head 4 from the axially outer end surfaces of the drilling fingers.

The axially outer end surfaces of the drilling fingers form drilling teeth 6 each shaped to form a cutting edge for the drilling tool. Each of the drilling teeth extends radially relative to the axis of the shank and a radially directed hard metal insert 7 is formed in each of the drilling teeth and extends slightly outwardly from the axial end surface provided by the drilling teeth. In addition, a radially extending hard metal insert 9 is positioned in the axial end surface of the centering projection and, as with the inserts 7, projects slightly outwardly from the end surface of the centering projection.

In FIG. 1 a helically coiled sheet metal member 11 is shown extending around the shank 2 from its drilling head end toward its other end. The sheet metal member 11 is loosely fitted about the shank. For the radial entrainment of the sheet metal member on the shank, its forward end 11a is bent-off, as shown in FIG. 1, and extends between a pair of the drilling fingers 3 terminating short of the drilling teeth 6. For securing the sheet metal member to the shank, a wedge can be used, not shown. Preferably, the sheet metal member 11 is detachably mounted on the drilling tool.

As can be seen in FIG. 2, the opposite lateral surfaces of each of the drilling fingers 3 have a slightly curved configuration so that the surfaces diverge in the inward direction from the radially outer to the radially inner surfaces of the drilling fingers. Further, the drilling tool head is shaped to provide a free or open space 13 between each adjacent pair of drilling fingers with the open space limited in the radially outward direction by the circle including the radially outer end surfaces of the drilling fingers 3 and drilling teeth 6. Further, the open space 13 is limited by the lateral surfaces of the adjacent drilling fingers and teeth and by the radially outer surface of the recess 5. Accordingly, at a position spaced between the drilling teeth each of the open spaces 13 has a maximum radial dimension y. As can be seen in FIG. 1, since the recess 5 is formed inwardly from the axial end surfaces of the drilling teeth 6, three openings are provided from the annular recess 5 one into each of the open spaces 13. As can be noted in FIG. 1, the radially outer surface of the drilling head from the circle 12 including the radially outer surfaces of the drilling teeth tapers slightly in the direction toward the shank 2. Further, at a spaced position from the drilling teeth 6, each of the drilling fingers has its outer surface converging more sharply inwardly toward the shank.

In FIG. 2 the spacing between adjacent drilling fingers and teeth at the radially inner surfaces of the drilling fingers and teeth is identified by the dimension $x$. It is this opening indicated by the dimension $x$ through which drilled materials can pass from the recess 5 into the open space 13 prior to moving rearwardly through the bore hole with the assistance of the sheet metal member 11 mounted on the shank 2. To afford the desired function of the rock drilling tool, the spacing or dimension $x$ between the radially inner roots or surfaces of adjacent drilling teeth, the maximum radial dimension of the open space 13 designated by the dimension $y$, and the depth of the annular recess 5 are at least equal to the difference between the radius of the centering projection 8 and the radius of the inner circle including the radially inner surfaces or roots of the drilling teeth 6.

While a specific embodiment of the invention has been shown and described in detail to illustrate the application of the inventive principles, it will be understood that the invention may be embodied otherwise without departing from such principles.

What is claimed is:

1. A rock drilling tool, particularly for use with a hammer drill, comprises an elongated axially extending shank, a drilling tool head secured to and extending axially from one end of said shank, said driling tool head having at least three angularly spaced drilling fingers extending axially outwardly from the end of said shank and each of said drilling fingers extends radially outwardly relative to the axis of said shank, each said drilling finger has a drilling tooth extending in the radial direction and forming the axial end surface of said drilling finger and the radially outer ends of said drilling teeth are located on a circle having a diameter greater than the diameter of said shank, a centering projection located on the axis of said shank and projecting axially outwardly beyond the axial end surfaces of said drilling teeth, the lateral surface of said centering projection located inwardly from the radially inner surfaces of said drilling fingers and said drilling tool head having an annular recess therebetween extending axially inwardly from the axial end surfaces of said drilling teeth, the radially extending lateral surfaces of said drilling fingers defining therebetween an open space limited in the radially outer circumferential direction by said circle including the radially outer ends of said drilling teeth and in the radially inner circumferential direction by the radially outer circumferential surface of said annular recess with said open space communicating with said annular space at the spacing between the radially inner roots of adjacent said drilling teeth, and the spacing between the radially inner roots of adjacent said drilling teeth the maximum radial dimension of said open space and the depth of said annular recess being at least equal to the difference between the radius of said centering projection and the radius of the circle including the radially inner ends of said drilling teeth.

2. A rock drilling tool, as set forth in claim 1, wherein the diameter of said drilling tool head diminishes from the circle including the radially outer ends of said drilling teeth in the axial direction toward said shank.

3. A rock drilling tool, as set forth in claim 1, wherein said centering projection has a circular cross section.

4. A rock drilling tool, as set forth in claim 1, wherein said centering projection is detachably connected to said drilling tool head.

5. A rock drilling tool, as set forth in claim 4, wherein a hard metal insert is positioned in said centering projection extending radially of the axis of said shank and forming the axially outer end of said centering projection.

6. A rock drilling tool, as set forth in claim 1, wherein a radially extending hard metal insert is located in the axially outer end surface of each of said drilling teeth and extends radially from the inner circle including the radially inner ends of said drilling teeth to the outer circle including the radially outer ends of said drilling teeth.

7. A rock drilling tool, as set forth in claim 6, wherein said hard metal insert have their radial axes arranged in equiangularly spaced parallel relationship.

8. A rock drilling tool, as set forth in claim 1, wherein a sheet metal member is helically coiled about and contacts said shank and extends radially outwardly from the lateral surface of said shank.

9. A rock drilling tool, as set forth in claim 8, wherein an entraining element secures said sheet metal member to said shank.

10. A rock drilling tool, as set forth in claim 8, wherein one end of said sheet metal member is positioned between a pair of said drilling fingers on said drilling tool head and is bent over into engagement with the surface of said drilling tool head.

11. A rock drilling tool, as set forth in claim 8, wherein the outer diameter of said sheet metal member is substantially equal to the diameter of the circle including the radially outer ends of said drilling teeth.

* * * * *